(12) United States Patent
Ohkawa

(10) Patent No.: US 6,877,871 B2
(45) Date of Patent: Apr. 12, 2005

(54) LIGHT GUIDE PLATE, SURFACE LIGHT SOURCE DEVICE AND DISPLAY

(75) Inventor: Shingo Ohkawa, Koshigaya (JP)

(73) Assignee: Enplas Corporation, Kawaguchi (JP)

(*) Notice: Subject to any disclaimer, the term of this patent is extended or adjusted under 35 U.S.C. 154(b) by 0 days.

(21) Appl. No.: 09/916,297

(22) Filed: Jul. 30, 2001

(65) Prior Publication Data

US 2002/0030985 A1 Mar. 14, 2002

(30) Foreign Application Priority Data

Aug. 2, 2000 (JP) .................................. 2000-233802

(51) Int. Cl.[7] ................................................ F21V 7/04
(52) U.S. Cl. .................... 362/31; 362/561; 362/260; 362/341; 362/26; 349/65; 385/146
(58) Field of Search .......................... 362/31, 561, 260, 362/341, 26, 27; 349/65; 385/146

(56) References Cited

U.S. PATENT DOCUMENTS 6,334,690 B1 * 1/2002 Ohkawa ........................ 349/64

6,485,157 B2 * 11/2002 Ohkawa ........................ 362/31

* cited by examiner

Primary Examiner—Sandra O'Shea
Assistant Examiner—Bertand Zeade
(74) Attorney, Agent, or Firm—Staas & Halsey LLP

(57) ABSTRACT

A surface light source device comprises a light guide plate 15 having a back face 15E opposite with an emission face, the back face 15 being provided with a great number of micro-reflectors 19 and ridge-like projections 20. A U-shaped fluorescent lamp 14 is disposed along a plurality of end faces 15D, 15E and 15C. Light which is introduced into the light guide plate 15 through the end faces 15D and 15E is direction-converted by the micro-reflectors 19 to be directed to a generally frontal direction end emitted from the emission face. Each micro-reflector 19 realizes direction-conversion mainly through successive double inner-reflections at a pair of slopes. Light introduced into the light guide plate 15 through the end face 15C, which extends in a direction generally perpendicular to the end faces 15D and 15E, is direction-converted by the ridge-like projections 20 having a pair of slopes 20A, 20B to be directed to a generally frontal direction end emitted from the emission face. An LCD panel is supplied with the emission. Direction conversion sharing depending on directions of light introduction brings an effective illumination output toward a generally frontal direction.

11 Claims, 8 Drawing Sheets

LIGHT GUIDE PLATE, SURFACE LIGHT SOURCE DEVICE AND DISPLAY

BACKGROUND

1. Field of Invention

The present invention relates to a light guide plate emitting light from an emission face after applying direction-conversion within the light guide plate to light supplied thereto sideways, and to a surface light source device and display employing the light guide plate.

2. Related Art

A well-known technique gives a surface light source device that employs a light guide plate having an incidence end face provided by a side end face and an emission face provided by one of two major faces (i.e. faces larger than end faces), wherein light is introduced into the light guide plate through incidence end face, the surface light source device being applied to various uses such as back-lighting for a liquid crystal display. A surface light source device of such a type has a basic performance greatly depending on a light guide plate employed therein.

A basic function of a light guide plate is to change a propagation direction (roughly in parallel with an emission face of the light guide plate) of light introduced into the light guide plate through a side end face so that the light is emitted through the emission face. As known well, a simply transparent light guide plate without any modification is capable of deflecting light little, providing a unsatisfactory brightness Therefore any means for promoting emission through the emission face is required.

The present inventor has proposed a light guide plate provided with so-called micro-reflectors and surface light source device/LCD employing the light guide plate, being disclosed in PCT/JP00-00871 (WO00-49432).

According to this proposed prior art, a light guide plate has a back face provided with a great number of micro-reflectors. As shown in FIG. 10, each micro-reflector has a first and second reflection surfaces which are a pair of inclined reflection surfaces to provide a valley inside. Upon reaching a micro-reflector and entering into a valley thereof on the way of propagation within the light guide plate, light is direction-converted mainly by inner-reflections effected twice. This twice effected inner reflection consist of two inner reflections, one inner reflection being effected at one of the first and second reflection surfaces and the other inner reflection then being effected at the other of the first and second reflection surfaces.

This direction-conversion produces light directed to the emission face, promoting emission from the emission face. A propagation direction of light after being direction-converted by each micro-reflector mainly depends on the inclinations (i.e. spatial directions) of the first and second reflection surfaces of the micro-reflector. Therefore angular emission characteristics of the light guide plate as a whole can be controlled within a remarkable range by means of adjusting factors such as direction distribution of reflection surfaces, or arraying pattern or distribution of the micro-reflectors.

According to typical designs, it is aimed that a light guide plate allows an emission face of the light guide plate to emit the most intensive light toward a generally frontal direction. Employable primary light sources for supplying light to the light guide plate include a line-like light source such as cold cathode lamp and point-like light source such as light emitting diode, both being usable for providing a surface light source device to have an improved brightness.

By the way, a known surface light source device applied to a car navigation device or the like employs a U-shaped fluorescent lamp as a primary light source, the U-shaped fluorescent lamp being disposed as to surround a light guide plate from three directions. According to this technique, light supply from three directions causes the total light supply (amount of inputted light) to be increased. Therefore the technique is advantageous for realizing a high brightness.

However, while two of the above three primary light supplying directions in the technique are parallel to each other, the other direction is generally perpendicular to the two directions. A problem arises if the above-mentioned micro-reflectors are employed in such a case where there are a plurality of primary light supplying directions including a pair of directions (called Direction 1 and Direction 2 for the sake of convenience) perpendicular to each other.

That is, if the micro-reflectors as shown in FIG. 10 are orientated as to be fit for Direction 1, while light supplied from Direction 1 is effectively direction-converted and directed to an emission face, light supplied from Direction 2 is not expected to be done so. Alternatively, if the micro-reflectors are orientated as to be fit for Direction 2, while light supplied from Direction 2 is effectively emission-promoted, light supplied from Direction 1 is not expected to be done so.

It is difficult in practice to determine a good, even if not the best, orientation of micro-reflectors fitting for both Direction 1 and Direction 2 because they are generally perpendicular to each other.

OBJECT AND SUMMARY OF INVENTION

The the present invention is proposed under the above-described background, aiming to provide an art that enables a light guide plate, surface light source device and display which are able to output effectively an illumination emission if light is supplied through incidence faces provided by a plurality of end faces extending in directions generally perpendicular to each other.

Viewing from another standpoint, the present invention aims to provide a technique which enables a generally frontal illumination emission effectively without a particular need of light propagation direction modifying member (such as prism sheet).

In the first place, the present invention is applied to a light guide plate which has an emission face provided by a major face, a back face opposite with the emission face and a plurality of end faces for introducing light, the end faces including a first end face extending in a first direction and a second end face extending in a second direction which is generally perpendicular to the first direction.

According to a feature of the present invention, the back face of the light guide plate is provided with not only a great number of projection-like micro-reflectors and but also a great number of ridge-like projections for direction-conversion. Each of the micro-reflectors has a pair of slopes which meet each other as to form a ridge that gets closer with an increasing distance from the first end face and extends in a direction generally perpendicular to the first direction. Each of the ridge-like projections extends in a direction generally parallel with the second direction.

This feature enables each micro-reflector to have an inner input, consisting of light which has been introduced into the light guide plate through the first end face, from directions falling within a certain angular range around a center direction perpendicular to the first direction. This inner input to each micro-reflector is effectively direction-converted into an inner output light directed to the emission face through double reflections effected by a pair of slopes of the micro-reflector. As a result, the light introduced into the light guide plate through the first end face is effectively outputted toward a generally frontal direction of the emission face.

On the other hand, a light introduced into the light guide plate through the second end face is also converted into an inner output light directed to the emission face due to direction-conversion effected by the ridge-like projections. Thus the light introduced into the light guide plate through the second end face is also effectively outputted toward a generally frontal direction of the emission face. After all, both fluxes of light introduced into the light guide plate through the first and second end faces are outputted toward a generally frontal direction of the emission face. This eliminates a particular need of light propagation direction modifying member (such as prism sheet) for modifying direction characteristics of the emission from the emission face.

A typical micro-reflector shape is like quadrangle pyramids. In a typical case, each ridge-like projections a pair of slopes extending in a direction generally parallel to the second direction, thereby uneven configurations being formed periodically and repeatedly along a direction generally perpendicular to the second direction.

In the next place, the present invention is applied to a surface light source device which has a light guide plate having an emission face provided by a major face, a back face opposite with said emission face and a plurality of end faces for introducing light, and at least one primary light source for supplying light to said end faces. The light guide plate is one featured as above.

That is, the back face of the light guide plate is provided with not only a great number of projection-like micro-reflectors and but also a great number of ridge-like projections for direction-conversion. Each of the micro-reflectors has a pair of slopes which meet each other as to form a ridge that gets closer with an increasing distance from the first end face and extends in a direction generally perpendicular to the first direction. Each of the ridge-like projections extends in a direction generally parallel with the second direction.

The merits of the light guide plate are maintained in the surface light source device. In other words, since the micro-reflectors and ridge-like projections operates effectively, both fluxes of light introduced into the light guide plate through the first and second end faces are outputted toward a generally frontal direction of the emission face. This eliminates a particular need of light propagation direction modifying member (such as prism sheet) for modifying direction characteristics of the emission from the emission face.

A typical micro-reflector shape is like quadrangle pyramids. In a typical case, each ridge-like projections a pair of slopes extending in a direction generally parallel to the second direction, thereby uneven configurations being formed periodically and repeatedly along a direction generally perpendicular to the second direction.

Further, the present invention is applied to a display having a liquid crystal display panel and a surface light source device for illumination the liquid crystal display panel. The liquid crystal display is one featured as above.

The merits of the surface light source device are maintained in the display. In other words, since the surface light source device is featured as above, the liquid crystal display is illuminated from a generally perpendicular direction, providing a screen which looks bright as viewed from a frontal direction.

EMBODIMENT

Figure 1:
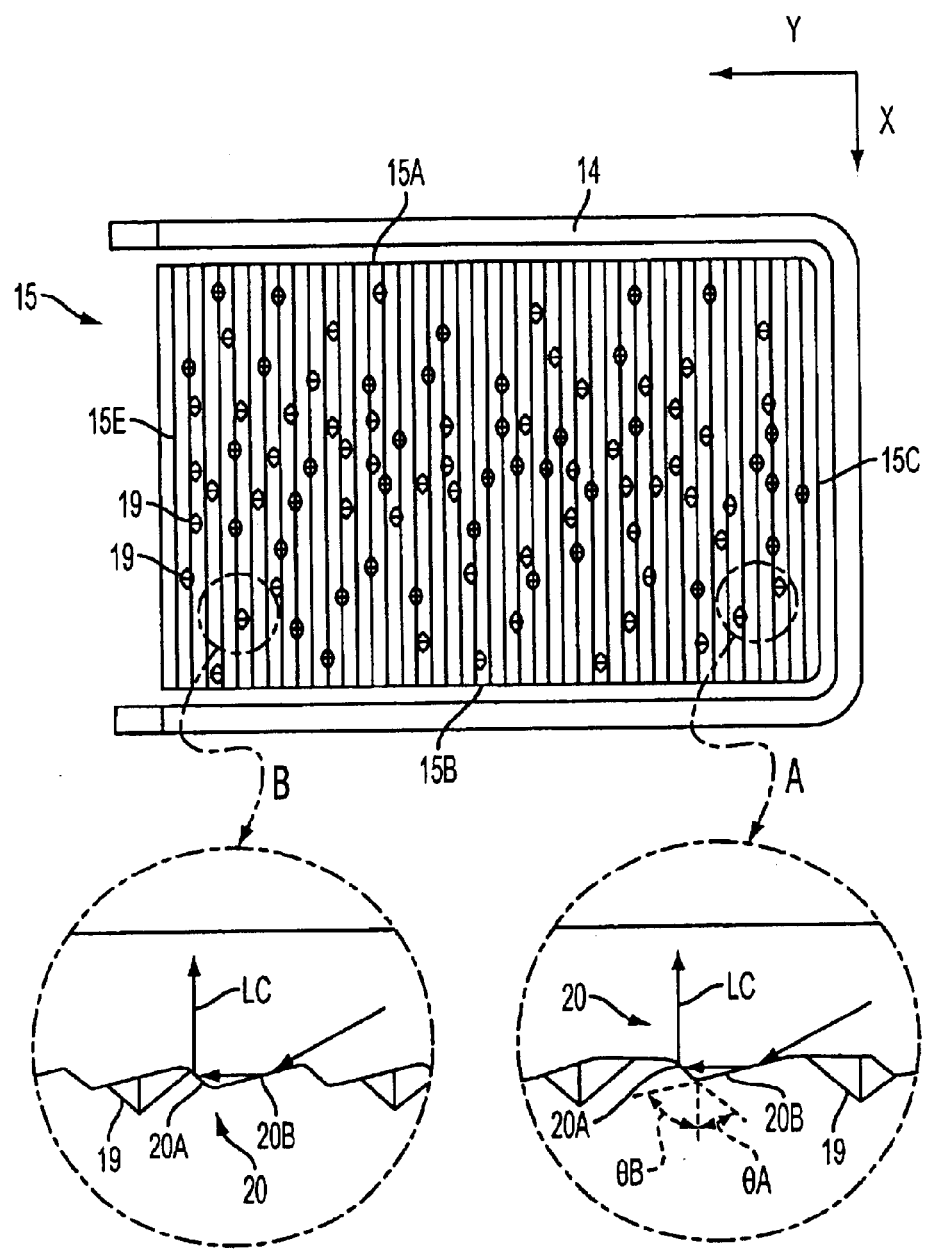
FIG. 1 is a plan view illustrating a back face of a light guide plate employed in a surface light source device applied to a liquid crystal display of a first embodiment in accordance with the present invention.

Embodiments in accordance with the present invention are described below in detail with referring to the drawings. It is noted that some parts are exaggerated as required for giving easy understandings in the drawings.

(1) First Embodiment

Figure 2:
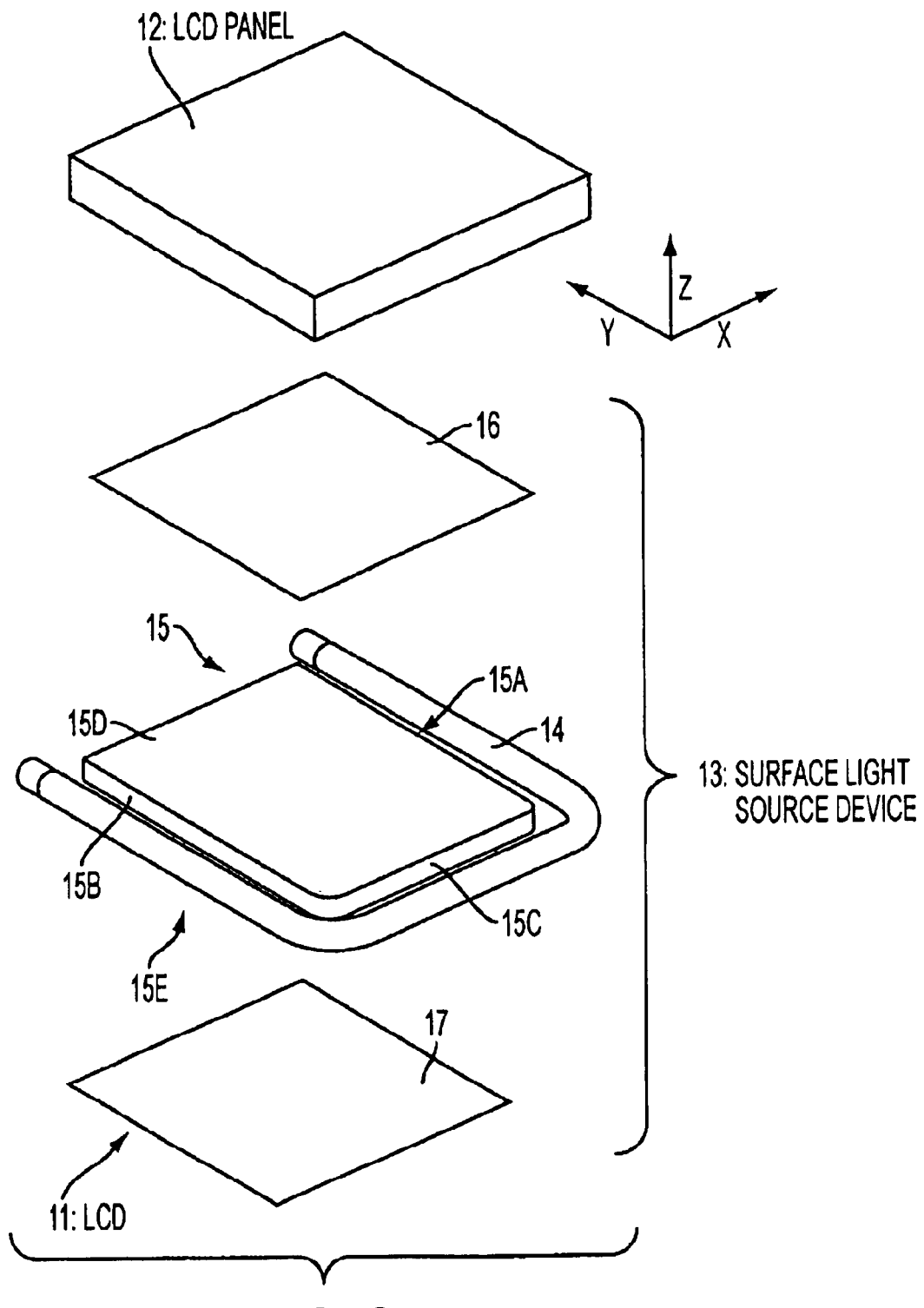
FIG. 2 is an exploded perspective view of the liquid crystal display to which the surface light source device employing the light guide plate shown in FIG. 1 is applied.

FIG. 2 is an exploded perspective view of the liquid crystal display of the first embodiment. A liquid crystal display 11 applied, for example, to a car navigation device, has a liquid crystal display panel 12 which illuminated from the back side by a surface light source device 13, providing an image. The light source device 13 has a light guide plate 15 and a U-shaped fluorescent lamp 14 disposed along three end faces 1515A, 15B and 15C of the light guide plate.

The light guide plate 15 have major faces which provide an emission face 15D and a back face 15E opposite with the emission face. In this embodiment, the back face 15E extends in parallel with the emission face 15D except fine-unevenness provided by micro-reflectors and ridge-like projections described later. A light diffusion sheet 16 and reflection sheet 17 are disposed along the emission face 15D and back face 15E, respectively.

The reflection sheet 17 made of a white sheet member reflects and returns a leaking light, which has gone out from the back face 15E, into the light guide plate 15, thereby avoiding loss of illumination light. The light diffusion sheet 16 is made of a light permeable sheet which scatters weakly the illumination light emitted from the emission face 15D. Such a weak scattering makes fine elements such as micro-reflectors described later inconspicuous and also makes an abnormal emission, even if it is caused by flaws or the like in the light guide plate 15, inconspicuous.

Further to this, the light diffusion sheet 16 relaxes a fine-unevenness in brightness, even if it appear on the emission face 15D, by means of the weak scattering effect. Saying from another standpoint, the light diffusing sheet 16 has a function of preventing the emission face 15 of the light guide plate 15 from being flawed.

The light guide plate 15 is an transparent injection-molded plain-plate-like member made of transparent material such as acrylic resin (PMMA resin) or cycloolefinic polymer.

The emission face 15D and back face 15E are shaped like rectangles, respectively, which have a pair of longer sides providing end faces 15A and 15B and a shorter side providing an end face 15C. In this embodiment, these three end faces serves as incidence faces (incidence end faces), respectively, along which a U-shaped fluorescent lamp 14 is arranged. In general, such a light introduction through a plurality of end faces brings an increased light input to the light guide plate as compared with cases where light is introduced through only one end face.

Figure 3A:
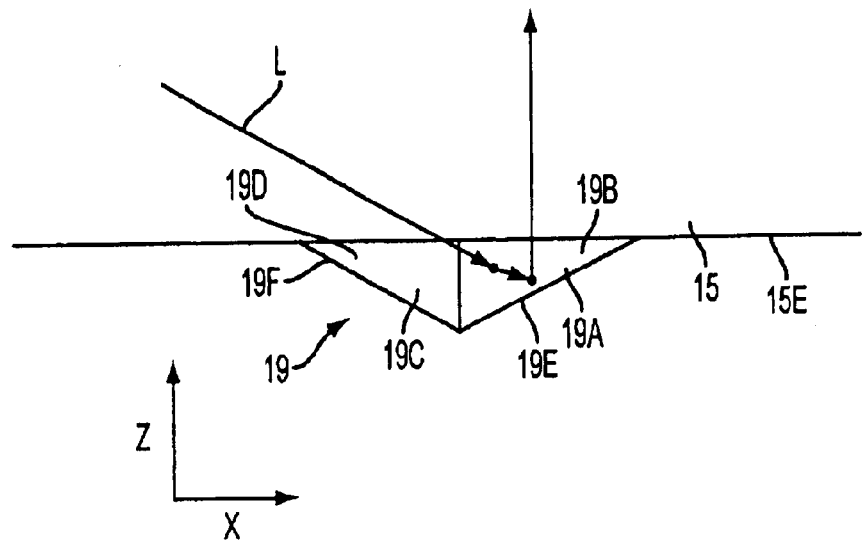
FIGS. 3a and 3b are a side view and plan view of a micro-reflector formed on a back face of the light guide plate shown in FIG. 1, respectively.
Figure 3B:
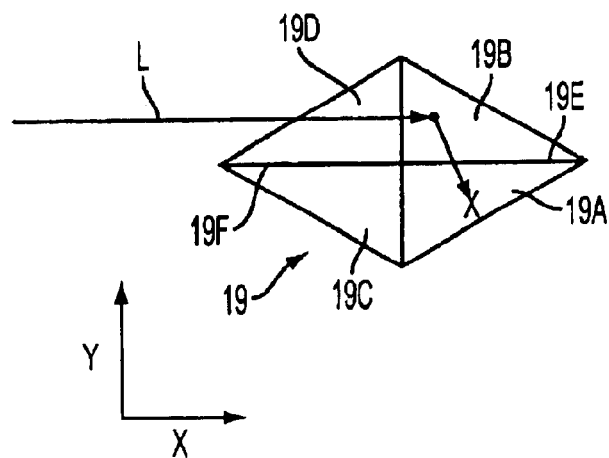

The emission face 15D provides a flat surface. On the other hand, the back face 15E is provided with a great number of projection-like micro-reflectors and a ridge-like projections. A direction-conversion effect is illustrated in FIGS. 3a and 3b which are a side view and backside plan view of a micro-reflector, respectively.

As understood from the illustrations, on inner-inputting into a micro-reflector 19, an illumination light L travelling within the light guide plate 15 is converted into an inner output light directed to a generally frontal direction with respect to the emission face 15D mainly through double reflections. This inner output light is outputted from the emission face 15D toward a generally frontal direction.

Seeing in details, the micro reflector 19 has a pair of slopes 19A and 19B, and another pair of slopes 19C and 19D which are formed as to avoid the illumination light approaching the slopes 19A and 19B from being blocked, wherein these four slopes 19A, 19B, 19C and 19D are geometrically connected directly to each other to form a shape like a quadrangle pyramid.

The slopes 19A and 19D are inclined as to meet each other and make a designed vertical angle. Besides, the slopes 19A and 19B provide a V-shaped valley getting shallower with an increasing distance from the end face 15A.

Thus the slopes 19A and 19B are formed face-symmetrically with respect to a plane which passes a ridge 19E and is perpendicular to the emission face 15D. The ridge 19E is inclined as to get closer to the back face 15E with an increasing distance from the incidence face 15A, extending generally perpendicular to the incidence face 15A.

Therefore almost all of illumination light L reaching the micro-reflectors 19 through the incidence face 15A does not make a large angle with the extending direction of the ridge 19E. Accordingly, light is introduced smoothly in the valleys on both sides of the ridge 19E, surely being guided to double and successive inner reflections by one and the other of the slopes 19A and 19B. As a result, an inner output light directed to the emission face 15D is produced, realizing an effective emission from the emission face 15 toward generally frontal directions thereof.

Each micro-reflector 19 has another pair of slopes 19C and 19D. These are inclined, like the slopes 19A and 19B, as to meet each other and make a designed vertical angle, thereby providing a ridge 19F corresponding to the meeting line. The slopes 19C and 19D provide a V-shaped valley getting shallower with an increasing distance from the end face 15B This valley is formed face-symmetrically with respect to a plane which passes a ridge 19F and is perpendicular to the emission face 15D. The ridge 19F is inclined as to get closer to the back face 15E with an increasing distance from the incidence face 15B, extending generally perpendicular to the incidence face 15B.

Such a structure causes illumination light L reaching the micro-reflector 19 via the incidence face 15B to be accepted smoothly into the valley formed on both sides of the ridge 19F. And an inner output light directed to the emission face 15D is produced through double reflections by one and the other of the slopes 19C and 19D, surely leading to an effective emission from the emission face 15B toward generally frontal directions thereof.

After all, both fluxes of light introduced into the light guide plate through the incidence faces 15A and 15B are emitted effectively toward a generally frontal direction of the emission face 15D.

It is noted that formation density of the micro reflectors 19 (covering rate; area covered by micro-reflectors per unit area) may be adjusted depending on position on the back face 15E so that a flat brightness distribution is obtained over the emission face 15D. Sizes of the micro-reflectors 19 are preferably designed as to be enough small to be hardly visible.

Further, an arrangement of the micro-reflectors are preferably designed so that they have no striking periodic regularity in order to prevent an overlapping relation with other fine elements (such as LCD cells or wiring pattern) from generating Mire pattern.

In the next place, a direction conversion applied to light introduced into the light guide plate 15 through the incidence face 15C is described. A great attention should be paid to a fact that the incidence face 15C extends in a direction generally perpendicular to both incidence faces 15A and 15B important and the micro-reflectors 19 are structured and orientated as above-mentioned, and accordingly, it is not expected that the micro-reflectors 19 have an effective direction conversion function.

Therefore another direction conversion means is required for this light coming via the incidence face 15C. This direction conversion means is provided by a great number of ridge-like projections formed on the back face 15E according to the present invention.

Referring to FIG. 1, enlarged illustrations A and B show cross sections of the light guide plate 15 at positions relatively close to and relatively far from the incidence face 15C beside a view of the back face 15E of the light guide plate 15. Each ridge-like projection 20 has a triangular cross section and extends in a direction generally perpendicular to the incidence face 15A, in other words, generally parallel to the incidence face 15C.

This extending direction is advantageous for preventing the ridge like projections 20 from shining and looking like excessively bright straight lines, which could be caused by light that introduce through the incidence faces 15A and 15B.

In this embodiment, each ridge-like projection has a pair of slopes 20A and 20B. The slopes 20A and 20B extend in a direction generally perpendicular to both incidence faces 15A and 15B as shown in FIG. 1. It should be noted that extending flat surfaces are cut off by micro-reflectors at locations occupied by them.

Each slope 20A on the side relatively far from the incidence face 15C converts, directly or indirectly, an direction of illumination light LC, which is introduced into the light guide plate 15 through the incidence face 15C, into a direction directed to the emission face 15D after being inner-reflected by a slope 20B.

Inclination angles θ A and θ B of slopes 20A and 20B are designed so that inner-reflections at slopes 20A and 20B are total reflections as surely as possible and a main direction after being inner-reflected at a slope 20A is generally frontal.

In practice, angle θ A is about 45 degrees and angle θ B is larger than angle θ A but smaller than 90 degrees. In this embodiment, θ A=45 degrees and θ B=75 degrees. It is noted that such angle θ B smaller than 90 degrees can avoid the light guide plate 15 from getting thinner with repeated configurations of slopes 20A.

As described above, the surface light source device 13 in this embodiment enables not only an illumination light introduced into to the light guide plate 15 trough the incidence faces 15A and 15B to be emitted as being promoted by the micro-reflectors 19 but also an illumination light introduced into to the light guide plate 15 trough the incidence face 15C extending in a direction generally perpendicular to the incidence faces 15A and 15B to be emitted as being promoted by the ridge-like projections 20. Besides, both emission promoting effects realize an emission generally frontal with respect to the emission face.

It is noted that the ridge-like projections 20 may be formed with a repetition pitch decreasing with an increasing distance from the incidence face 15C. If so formed, a reduced unevenness in brightness depending distance from the incidence face 15C can be obtained.

If a liquid crystal display panel 12 is illuminated by such a surface light source device 13 as shown in FIG. 2, the surface light source device 13 causes the liquid crystal display panel 12 to have a screen displaying a bright image which a user observes.

It is noted that an asymmetric micro-reflector having different configurations on the inner input side and the inner output side may be employed in cases where the incidence faces include two incidence faces 15A and 15B opposing to each other as in this embodiment. If so structured, two kinds of micro-reflectors may be arranged in correspondence to the incidence faces 15A and 15B, respectively.

In this case, however, an accordingly increased number of micro-reflectors are arranged and there arises a possibility that micro-reflectors shared for one incidence face affect on a propagation of light introduced through the other incidence face.

Further, the increased number of micro-reflectors as above limit a n area usable for the slopes 20A, possibly causing the slopes 20A to have a reduced direction conversion ability. In view of these matters, this embodiment employs symmetric micro-reflectors having the same configuration on the inner input side and the inner output side.

Figure 4:
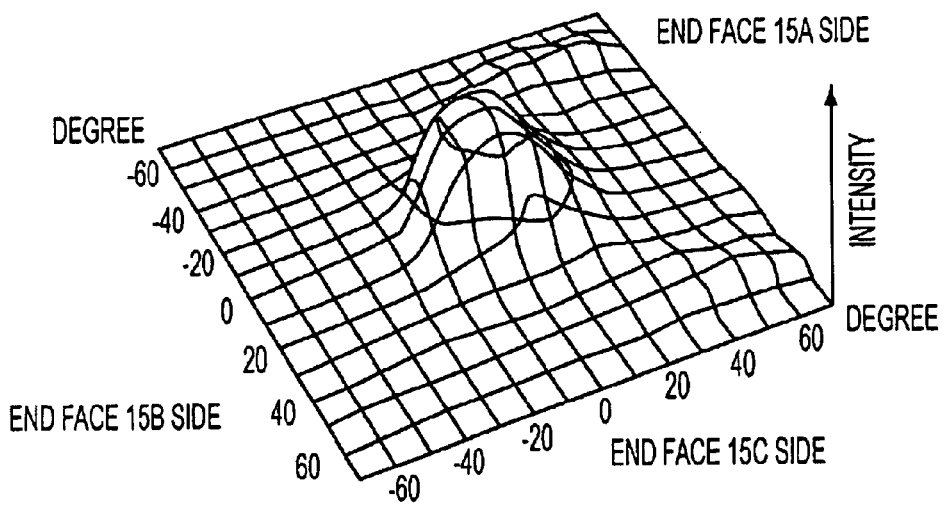
FIG. 4 is a graph plotting angular emission characteristics in a case where an illumination light is introduced through an incidence face corresponding to one of longer sides of the light guide plate shown in FIG. 1.
Figure 5:
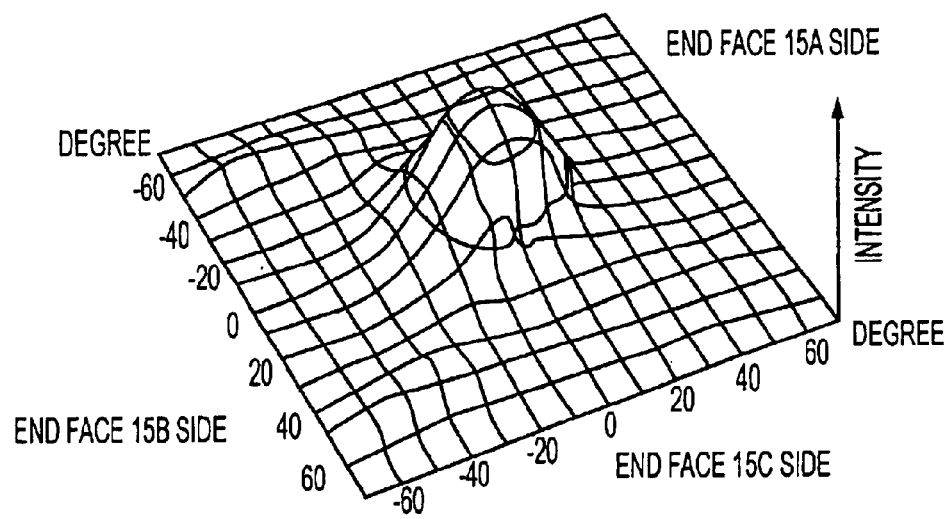
FIG. 5 is a graph plotting angular emission characteristics in a case where an illumination light is introduced though an incidence face corresponding to the other of the longer sides of the light guide plate shown in FIG. 1.
Figure 6:
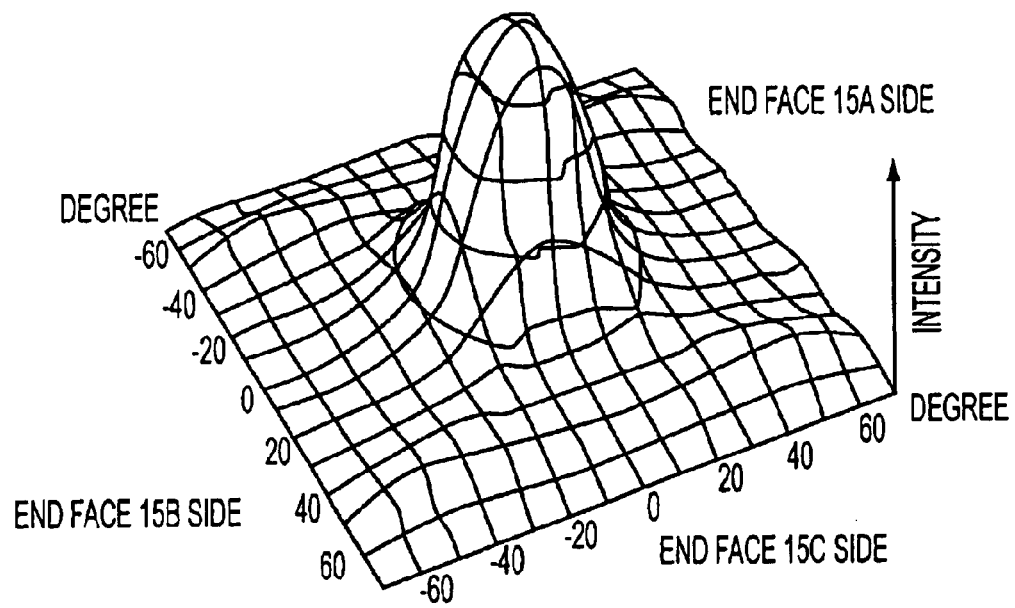
FIG. 6 is a graph plotting angular emission characteristics in a case where an illumination light is introduced at the same time though incidence faces corresponding to the respective longer sides of the light guide plate shown in FIG. 1.

In the next place, FIGS. 4 and 5 are graphs plotting angular emission characteristics in cases, respectively, in each of which a straight-line-like fluorescent lamp is arranged only at the incidence face 15A or only at the incidence face 15B. FIG. 6 is a graph plotting angular emission characteristics in a case where straight-line-like fluorescent lamps are arranged both at the incidence faces 15A and 15B.

Figure 7:
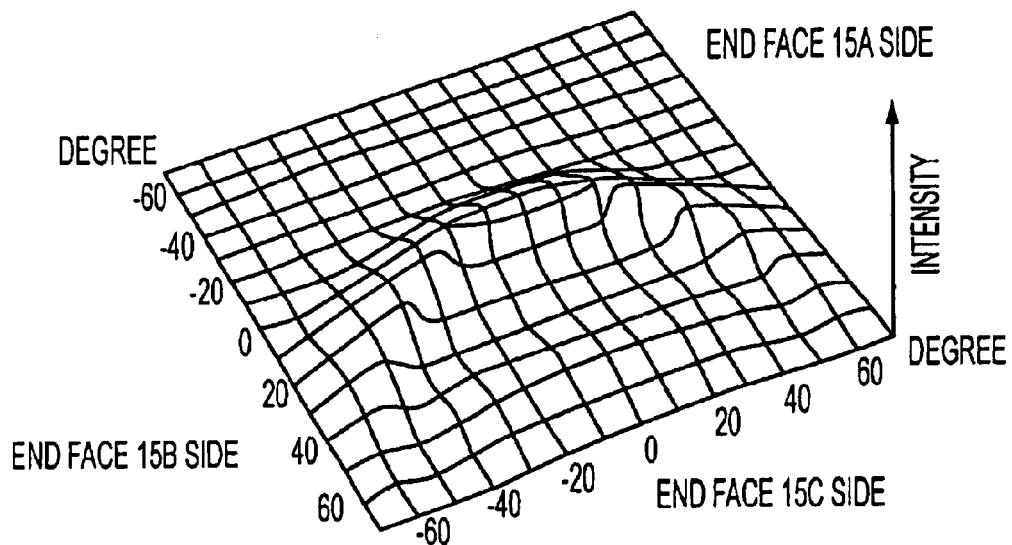
FIG. 7 is a graph plotting angular emission characteristics in a case where an illumination light is introduced though an incidence face corresponding to one of shorter sides of the light guide plate shown in FIG. 1.
Figure 8:
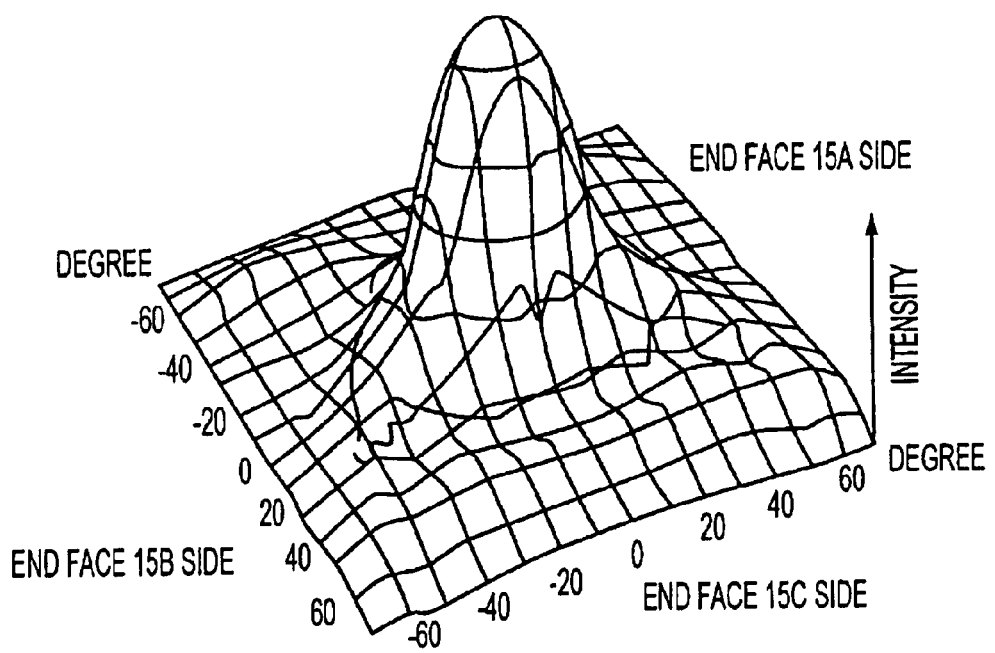
FIG. 8 is a graph plotting angular emission characteristics in a case where an illumination light is introduced at the same time though incidence faces corresponding to both respective longer sides and the one shorter side of the light guide plate shown in FIG. 1.

Further, FIG. 7 is a graph plotting angular emission face characteristics in a case where an illumination light is introduced though the incidence face 15C of the same light guide plate. And FIG. 8 is a graph plotting angular emission face characteristics in a case where an illumination light is introduced though all of the both longer incidence faces 15A and 15B and one shorter incidence face 15C of the light guide plate.

In the graphs of FIGS. 4 to 8, an ordinate on an ordinate axis extending obliquely from the left-handed bottom to the right-handed top expresses a direction (angle) in a plane perpendicular to the incidence faces 15A and 15B, and an ordinate on an ordinate axis extending obliquely from the right-handed bottom to the left-handed top expresses a direction (angle) in a plane perpendicular to the incidence face 15C. Angle of 0 degree corresponding to a frontal direction in each of the planes. And, an observed light intensity (amount of light) at a point above a generally center of the light guide plate is expressed in height of a mesh-like hill In the first place, it is understood from comparing FIG. 4 with FIG. 5 that fluxes of light introduced through the incidence faces 15A and 15B can be emitted with a generally equivalent directivity and intensity.

Further to this, it is understood from FIG. 6 that a simultaneous light introduction through both incidence faces 15A and 15B brings generally doubled emission. A preferential emission direction is generally frontal both in planes perpendicular and parallel to the incidence faces 15A and 15B without fail.

FIG. 7 also shows characteristics which provide a preferential emission direction frontal both in planes perpendicular and parallel to the incidence faces 15A and 15B, even if rather less sharp as compared with FIGS. 4 and 5. FIG. 8 illustrates characteristics obtained by piling up the graphs of FIGS. 6 and 7.

It is understood from FIG. 8 that characteristics providing a preferential emission direction frontal both in planes perpendicular and parallel to the incidence faces 15A and 15B is also obtained in the case where light is simultaneously introduced through incidence faces 15A, 15B and 15C. Besides, a very bright surface light source device can be provided by employing such a three-direction light supply.

(2) Second Embodiment

Figure 9:
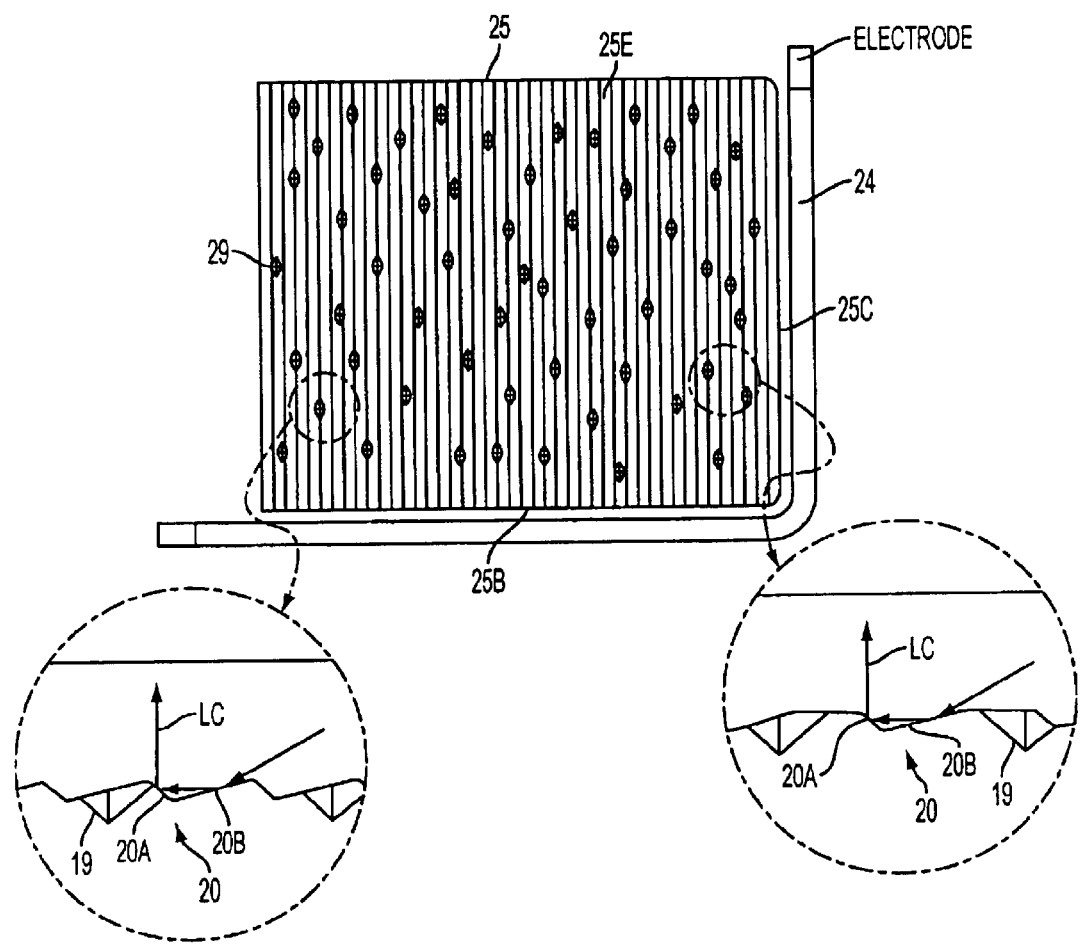
FIG. 9 is a plan view illustrating a back face of a light guide plate employed in a surface light source device applied to a liquid crystal display of a second embodiment in accordance with the present invention; and, FIG. 10 is a perspective view illustrating an operation of a micro-reflector employed in a prior proposed art.
Figure 10:
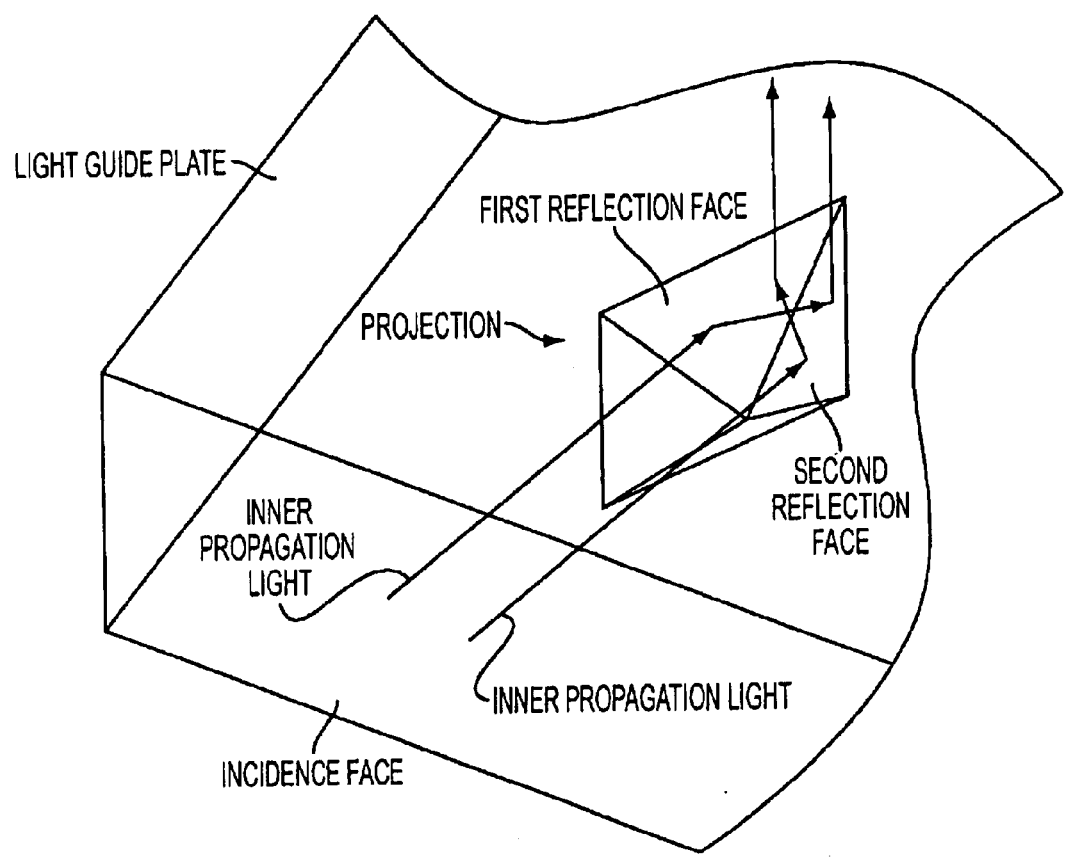

FIG. 9 is a plan view illustrating a back face of a light guide plate employed in a surface light source device applied to a liquid crystal display of a second embodiment in accordance with the present invention.

This embodiment employs a light guide plate 25 which has the same structure as that of the light guide plate 15 in employed in the first embodiment, as understood easily from a comparison with FIG. 1, except that a fluorescent lamp 24 having a different shape and differently arranged is employed and the light guide plate 25 has a differently structured back face 25E.

Therefore the following description is focused on the difference. In the first place, the fluorescent lamp 24 is generally L-shaped, being disposed as to along an end face 25B corresponding to one of longer sides and along an adjacent end face 25C corresponding to one of shorter sides. Accordingly, the end faces 25A and 25B provide incidence faces and light is introducer through the end faces 25A and 25B which extend perpendicularly to each other.

The back face 25E is provided with a great number of micro-reflectors 29 and ridge-like projections 20 in a similar way as compared with the light guide plate 15 employed in the first embodiment. Each ridge-like projections 20 has slopes 20A and 20B which extend in a direction generally perpendicular to the incidence face 25B and generally parallel to the incidence face 25C.

Each micro-reflector 29 has a shape similar to that of a micro-reflector 19 employed in the first embodiment. That is, a pair of slopes are formed as to meet each other, providing a ridge. Each micro-reflector 29 is orientated so that the ridge extends in a direction generally perpendicular to the incidence face 25B.

Further, an arrangement of the micro-reflectors 29 are designed so that they have no striking periodic regularity.

In this embodiment, a flux of light introduced through the incidence faces 25B is direction-converted mainly by the micro-reflectors 29 into a flux having a generally frontal direction, being emitted from an emission face.

On the other hand, a flux of light introduced through the incidence faces 25C is direction-converted mainly by the ridge-like projections 20 into a flux having a generally frontal direction, being emitted from an emission face. Details of direction conversion effected by micro-reflectors and ridge-like projections are not repeated because they will be understood from those in the first embodiment.

(3) Modifications

The above-described embodiments do not limit the scope of the present invention at all. For example, the following modifications are allowed without deviating from the scope of the present invention.

(i) Micro-reflectors may be shaped differently as compared with the above embodiments. The employed symmetric shape having an equivalent configuration at the input side and out put side is a simply structured example. In some cases, asymmetrically shaped micro-reflectors may be employed.

Further, micro-reflectors shaped like other than quadrangle pyramids may be adopted. It is essential that micro-reflectors are able to provide a generally frontal emission after a direction-conversion through mainly double reflections at a pair of slopes. It is, however, preferably avoided surely as possible to employ a shape such that the inner incidence to the slopes is blocked.

(ii) Ridge-like projectionS 20 may have a cross section shaped like other than triangle provided by a pair of slopes. For example, only slopes 20A may be formed. If so shaped, the light guide plate gets thinner gradually along a direction.

(iii) A pair of slopes of each micro-reflector need not always to be connected directly to each other. A pair of slopes may be connected to each other with a curved face interposed between them so far as a practically enough performance is realized. Alternatively, a pair of slopes themselves may consist of curved surfaces.

In these cases, as viewed from the emission face side, top lines of the curved surfaces forms ridges, and micro-reflectors are orientated so that the ridges extend in a direction generally perpendicular to an incidence face.

(iv) A covering rate of micro-reflectors may be adjusted as required. And this adjustment may be performed through adjusting number density or size of micro-reflectors. Both may be applied in combination at the same time.

(v) In the above embodiment, a pitch adjustment of the slopes 20A of the ridge like projections 20 is employed for providing a flat emission intensity. However, factors such as size of a slope 20A may be adjusted instead of or in addition to such a pitch adjustment. In every case, such adjustments are preferably carried out as required.

(vi) The above embodiments are described as they are applied to displays for a car navigation devices. However, this puts no limitation, and the present invention may be applied to various appliances which require a surface-like illumination.

What is claimed is:

1. A light guide plate comprising:
    an emission face provided by a major face;
    a back face opposite with said emission face; and
    a plurality of end faces for introducing light, the end faces including a first end face extending in a first direction and a second end face extending in a second direction which is generally perpendicular to said first direction,
    wherein said back face is provided with a great number of projection-like micro-reflectors and a great number of ridge-like projections for direction conversion, each of said micro-reflectors having a pair of slopes which meet each other as to form a ridge that gets closer to said back face with an increasing distance from said first end face and extends in a direction generally perpendicular to said first direction, said great number of ridge-like projections extending in a direction generally parallel with said second direction.

2. A light guide plate in accordance with claim 1, wherein said micro-reflectors are shaped like quadrangle pyramids.

3. A light guide plate in accordance with claim 1 or 2, wherein each of said ridge-like projections has a pair of slopes extending in a direction generally parallel with said second direction, thereby uneven configurations being formed periodically and repeatedly along a direction generally perpendicular to said second direction.

4. A surface light source device comprising:
    a light guide plate having an emission face provided by a major face, a back face opposite with said emission face and a plurality of end faces for introducing light, and at least one primary light source for supplying light to said end face, said end faces including a first end face extending in a first direction and a second end face extending in a second direction which is generally perpendicular to said first direction,
    wherein said back face is provided with a great number of projection-like micro-reflectors and a great number of ridge-like projections for direction-conversion, each of said micro-reflectors having a pair of slopes which meet each other as to form a ridge that gets closer to said back face with an increasing distance from said first end face and extends in a direction generally perpendicular to said first direction, said great number of ridge-like projections extending in a direction generally parallel with said second direction.

5. A surface light source device in accordance with claim 4, wherein said micro-reflectors are shaped like quadrangle pyramids.

6. A surface light source device in accordance with claim 4 or 5, wherein each of said ridge-like projections has a pair of slopes extending in a direction generally parallel with said second direction, thereby uneven configurations being formed periodically and repeatedly along a direction generally perpendicular to said second direction.

7. A display including a liquid crystal display panel and a surface light source device for illumination said liquid crystal display panel, said surface light source device comprising:

a light guide plate having an emission face provided by a major lace, a back face opposite with said emission face and a plurality of end faces for introducing light, and at least one primary light source for supplying light to said end faces, said end faces including a first end face extending in a first direction and a second end face extending in a second direction which is generally perpendicular to said first direction, wherein said back face is provided with a great number of projection-like micro-reflectors and a great number of ridge-like projections for direction-conversion, each of said micro-reflectors having a pair of slopes which meet each other as to form a ridge that gets closer to said back face with an increasing distance from said first end face and extends in a direction generally perpendicular to said first direction, said great number of ridge-like projections extending in a direction generally parallel with said second direction.

8. A display in accordance with claim 7, wherein said micro-reflectors are shaped like quadrangle pyramids.

9. A display in accordance with claim 7 or 8, wherein each of said ridge-like projections has a pair of slopes extending in a direction generally parallel with said second direction, thereby uneven configurations being formed periodically and repeatedly along a direction generally perpendicular to said second direction.

10. A light guide plate comprising:

an emission face;

a back face opposite to said emission face; and a first end face to introduce light, wherein said back face is provided with a plurality of projection-like micro-reflectors and a plurality of ridge-like projections for direction conversion, each of said micro-reflectors having a pair of slopes which meet each other to form a ridge that gets closer to said back face with an increasing distance from said first end face.

11. A light guide plate in accordance with claim 10, further comprising a second end face, wherein the first end face extends in a first direction, the second end face extends in a second direction perpendicular to the first direction, the ridge extends perpendicular to the first direction and the ridge-like projections extend parallel to the second direction.

* * * * *

UNITED STATES PATENT AND TRADEMARK OFFICE
CERTIFICATE OF CORRECTION

PATENT NO. : 6,877,871 B2
DATED : April 12, 2005
INVENTOR(S) : Shingo Ohkawa

It is certified that error appears in the above-identified patent and that said Letters Patent is hereby corrected as shown below:

Column 7,
Line 33, change "trough" to -- through --;

Column 8,
Lines 11 and 14, change "though" to -- through --;

Column 9,
Line 46, change "emission" to -- omission --;
Line 51, change "projectionS" to -- projections --;

Column 11,
Line 6, change "lace" to -- face --.

Signed and Sealed this

Twenty-eighth Day of February, 2006

JON W. DUDAS
*Director of the United States Patent and Trademark Office*